USO10642962B2

(12) United States Patent
Amaral Cid et al.

(10) Patent No.: US 10,642,962 B2
(45) Date of Patent: May 5, 2020

(54) LICENSABLE FUNCTION FOR SECURING STORED DATA

(71) Applicant: Western Digital Technologies, Inc., San Jose, CA (US)

(72) Inventors: Carlos Frederico Amaral Cid, Ascot (GB); Matthew Warren Dodd, Salisbury (GB); David L. Blankenbeckler, Longmont, CO (US); Joseph Edward Halpern, III, San Jose, CA (US); Ian E. Harvey, Lake Forest, CA (US); Christopher R. Odgers, Claremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 525 days.

(21) Appl. No.: 14/811,708

(22) Filed: Jul. 28, 2015

(65) Prior Publication Data
US 2017/0032108 A1 Feb. 2, 2017

(51) Int. Cl.
*G06F 21/10* (2013.01)
*H04L 9/06* (2006.01)

(52) U.S. Cl.
CPC ............. *G06F 21/10* (2013.01); *H04L 9/06* (2013.01); *H04L 9/0656* (2013.01); *G06F 2221/0704* (2013.01)

(58) Field of Classification Search
CPC ....... H04L 9/0693; H04L 9/06; H04L 9/0656; G06F 21/10; G06F 2221/0704
See application file for complete search history.

(56) References Cited

U.S. PATENT DOCUMENTS

| 7,789,757 B2 | 7/2010 | Gemelos et al. |
| 8,359,473 B1 | 1/2013 | Sorotokin et al. |
| 8,831,217 B2 | 9/2014 | Blankenbeckler et al. |
| 8,831,218 B2 | 9/2014 | Blankenbeckler et al. |
| 8,990,119 B2 | 3/2015 | Gemelos et al. |
| 8,996,535 B1 | 3/2015 | Kimmel et al. |
| 2001/0002486 A1 | 5/2001 | Kocher et al. |
| 2001/0053220 A1 | 12/2001 | Kocher et al. |
| 2002/0099948 A1 | 7/2002 | Kocher et al. |
| 2003/0028771 A1 | 2/2003 | Kocher et al. |

(Continued)

FOREIGN PATENT DOCUMENTS

KR 100365916 B1 12/2002

OTHER PUBLICATIONS

Korean International Search Report & Written Opinion dated Nov. 1, 2016 for related PCT/US2016/044462.

*Primary Examiner* — Alexander Lagor
*Assistant Examiner* — Forrest L Carey
(74) *Attorney, Agent, or Firm* — Barry IP Law, P.C.

(57) ABSTRACT

For securing content accessed from storage device, the storage device is associated with a licensee identifier. The licensee identifier is provided as input to an algorithm that generates, based on the identifier, a determinate set of instructions for a computer, for example, source code in a coding language, compiled binary code, or pseudo code that is capable of being translated into source code. The code, once compiled to machine-usable form, can be executed by a processor to perform a permutation operation that is unique to the licensee identifier. The output of the permutation operation can be used for protecting data provided by the storage device.

27 Claims, 13 Drawing Sheets

(56) References Cited

U.S. PATENT DOCUMENTS

| | | |
|---|---|---|
| 2004/0049685 A1* | 3/2004 | Jaloveczki .............. G06F 21/36 |
| | | 713/182 |
| 2004/0086114 A1 | 5/2004 | Rarick |
| 2007/0033419 A1 | 2/2007 | Kocher et al. |
| 2008/0037781 A1 | 2/2008 | Kocher et al. |
| 2008/0049935 A1 | 2/2008 | Kocher et al. |
| 2008/0101604 A1 | 5/2008 | Kocher et al. |
| 2008/0130886 A1 | 6/2008 | Kocher et al. |
| 2008/0133938 A1 | 6/2008 | Kocher et al. |
| 2008/0137848 A1 | 6/2008 | Kocher et al. |
| 2010/0262824 A1* | 10/2010 | Keshavachar .......... G06F 21/10 |
| | | 713/168 |
| 2011/0225417 A1* | 9/2011 | Maharajh ................ G06F 21/10 |
| | | 713/150 |
| 2012/0192283 A1 | 7/2012 | Gu et al. |
| 2012/0311338 A1 | 12/2012 | Farrugia et al. |
| 2013/0132733 A1 | 5/2013 | Agrawal et al. |
| 2014/0044265 A1 | 2/2014 | Kocher et al. |
| 2014/0247944 A1 | 9/2014 | Kocher et al. |
| 2014/0258734 A1 | 9/2014 | Kim |
| 2014/0359755 A1 | 12/2014 | Beitel et al. |
| 2015/0052368 A1 | 2/2015 | Kocher et al. |
| 2015/0089670 A1 | 3/2015 | Yanagawa |
| 2015/0141137 A1 | 5/2015 | Gemelos et al. |
| 2015/0178478 A1 | 6/2015 | Kocher et al. |

* cited by examiner

FIG. 6A — 610

| Index | $\pi \in S_\Omega$ | Index | $\pi \in S_\Omega$ |
|---|---|---|---|
| 00 | (0 1 2 3) | 08 | (0 1 3 2) |
| 01 | (0 2 3 1) | 09 | (0 3 2 1) |
| 02 | (0 1 2) | 10 | (0 2 1) |
| 03 | (0 1 3) | 11 | (0 3 1) |
| 04 | (0 2 3) | 12 | (0 3 2) |
| 05 | (1 2 3) | 13 | (1 3 2) |
| 06 | (0 2) | 14 | (1 3) |
| 07 | (1 2) | 15 | (0 3) |

FIG. 6B — 620

| i | r |
|---|---|
| 00 | 11 |
| 01 | 13 |
| 10 | 17 |
| 11 | 21 |

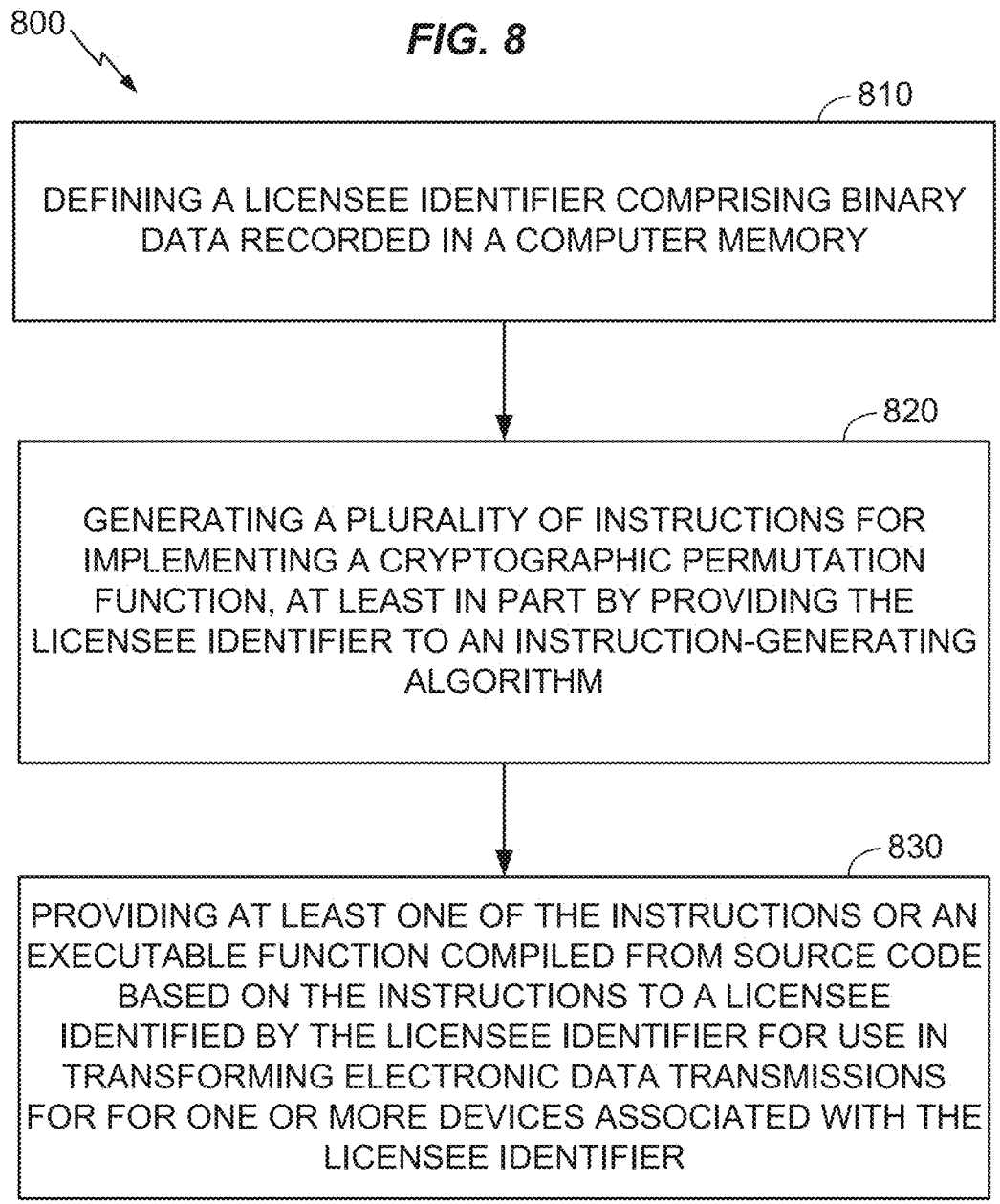

910 — GENERATING THE PLURALITY OF INSTRUCTIONS FOR IMPLEMENTING THE CRYPTOGRAPHIC PERMUTATION FUNCTION IS BASED ON A PSEUDORANDOM BYTE STRING, WHEREIN OPERATION OF THE CRYPTOGRAPHIC PERMUTATION FUNCTION WHEN COMPILED AND EXECUTED BY A PROCESSOR IS UNIQUELY DETERMINED BY THE PSEUDORANDOM BYTE STRING

920 — GENERATING, BY A STRING-GENERATING ALGORITHM, THE PSEUDORANDOM BYTE STRING BASED ON THE LICENSEE IDENTIFIER, THE PSEUDORANDOM BYTE STRING BEING UNIQUE TO THE LICENSEE IDENTIFIER

930 — RECORDING AT LEAST ONE OF THE LICENSEE IDENTIFIER, THE PLURALITY OF INSTRUCTIONS, THE EXECUTABLE FUNCTION, OR THE PSEUDORANDOM BYTE STRING IN AN ELECTRONIC DATABASE, IN ASSOCIATION WITH IDENTIFYING INFORMATION FOR THE LICENSEE

LICENSABLE FUNCTION FOR SECURING STORED DATA

FIELD

The present disclosure relates digital rights management (DRM) for securing data held in, obtained from, or transmitted to storage in non-transitory computer-readable storage media.

BACKGROUND

Data security is important for many reasons, and data stored in non-transitory computer-readable storage media can be quite valuable. Although DRM methods and systems exist to secure stored data, existing methods may suffer from weaknesses that make stored data vulnerable to unauthorized use. At the same time, the widespread adoption of portable content devices such as smart phones, notepad computers, and the like, has increased public demand for consumption of copyrighted content from various types of portable non-transitory computer-readable and writable storage media. Such non-transitory computer-readable storage media include, for example, solid-state drives (SSDs), hard disk drives, Universal Serial Bus (USB) memory sticks, flash memory cards, and other portable storage devices. Data stored on these types of storage media may not be sufficiently secured against theft or unauthorized access, using existing DRM methods.

It would be desirable, therefore, to develop new methods and other new technologies for securing data held in, obtained from, or transmitted to storage in non-transitory computer-readable storage media, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method for enabling secure electronic data includes defining a licensee identifier comprising binary data recorded in a computer memory. The method further includes automatically generating, by a processor, a plurality of machine instructions for a cryptographic permutation function, at least in part by providing the licensee identifier to an instruction-generating algorithm. The machine instructions may include, for example, source code, executable binary code, or pseudo code. The method further includes providing at least one of the instructions or an executable function compiled from source code based on the instructions to the licensee for use in protecting electronic data from one or more devices associated with the licensee identifier. The one or more devices associated with the licensee identifier may be, or may include a storage device; for example, one or more of a solid-state drive (SSD), a hard disk drive (HDD), a Universal Serial Bus (USB) memory stick, or a flash memory reader and card. In addition, the one or more devices associated with the licensee identifier may be, or may include a player device; for example, a media player, a video player component of a mobile or stationary computer, a "smart TV", or a media streaming device.

In an aspect, generating the plurality of instructions for implementing the cryptographic permutation function may be based on a pseudorandom byte string, wherein operation of the cryptographic permutation function when compiled and executed by a processor is uniquely determined by the pseudorandom byte string. For example, the cryptographic permutation function may be, or may include, "Addition, cyclic Rotation and eXclusive or" (ARX) components. In a related aspect, values controlling the addition, rotation, and "exclusive or" ARX components may be determined based on the pseudorandom byte string that is, in turn, a pseudorandom function of the licensee identifier.

In another aspect, the method may include generating, by a string-generating algorithm, the pseudorandom byte string based on the licensee identifier, wherein the pseudorandom byte string is unique to the licensee identifier. For example, the string-generating algorithm may take a system key and the licensee identifier as inputs.

In another aspect, the method may include recording at least one of the licensee identifier, the plurality of instructions, the executable function, or the pseudorandom byte string in an electronic database, in association with identifying information for the licensee.

In other embodiments or aspects, a method for storing, by a first node (e.g., a storage node), content that has been protected using a cryptographic key, wherein the cryptographic key is obtainable by a second node (e.g. a player node) at least in part by transforming a first binary data string using a first cryptographic permutation algorithm comprising permutation operations that are defined at least in part by a unique licensee identifier of the second node. The method further includes sending the content that is protected by the cryptographic key to the second node.

As used herein, a "storage node" is a storage device that is communicatively coupled to another computing component for accessing (e.g., viewing, listening to) content stored on the storage node. Likewise, a "content access node" is a content access device that in communicatively coupled to a device from which it receives content, for example from a storage node. As used herein, a "device" includes at least a computer processor coupled to a memory and to one or more ports, including at least one input port and at least one output port. A computer processor may include, for example, a microprocessor, microcontroller, system on a chip, or other processing circuit. As used herein, a "processor" means a computer processor.

As used herein, a "licensee" means a person or legal entity holding, or purporting to hold, a license or other legal right to receive, use, or provide, in a secure form, a cryptographic permutation function customized as described herein for a particular use, with one or more devices to be made or distributed by the licensee. For example, a licensee may be a manufacturer of storage devices equipped for use with a secure content protection and distribution system, which securely provides the cryptographic permutation function in a component of the storage devices. It should be appreciated that, in certain embodiments disclosed, each cryptographic permutation function may be customized for a particular use by one or more lengthy secret keys or processes, and any function that is not configured correctly will not work for its intended purpose. Hence, it is virtually impossible for anyone to possess a useful copy of the cryptographic permutation function, without receiving the copy from a developer, developing the copy themselves for use in a self-contained system, or acquiring the copy by some illicit means.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 6A and 6B are data tables illustrating examples of values that may be used in a licensable function generator process.

FIG. 8 is a flow chart illustrating a method for enabling a secure electronic data transmission using a licensable function.

FIGS. 9-10 are flow charts illustrating further optional aspects or operations of the method diagrammed in FIG. 8.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
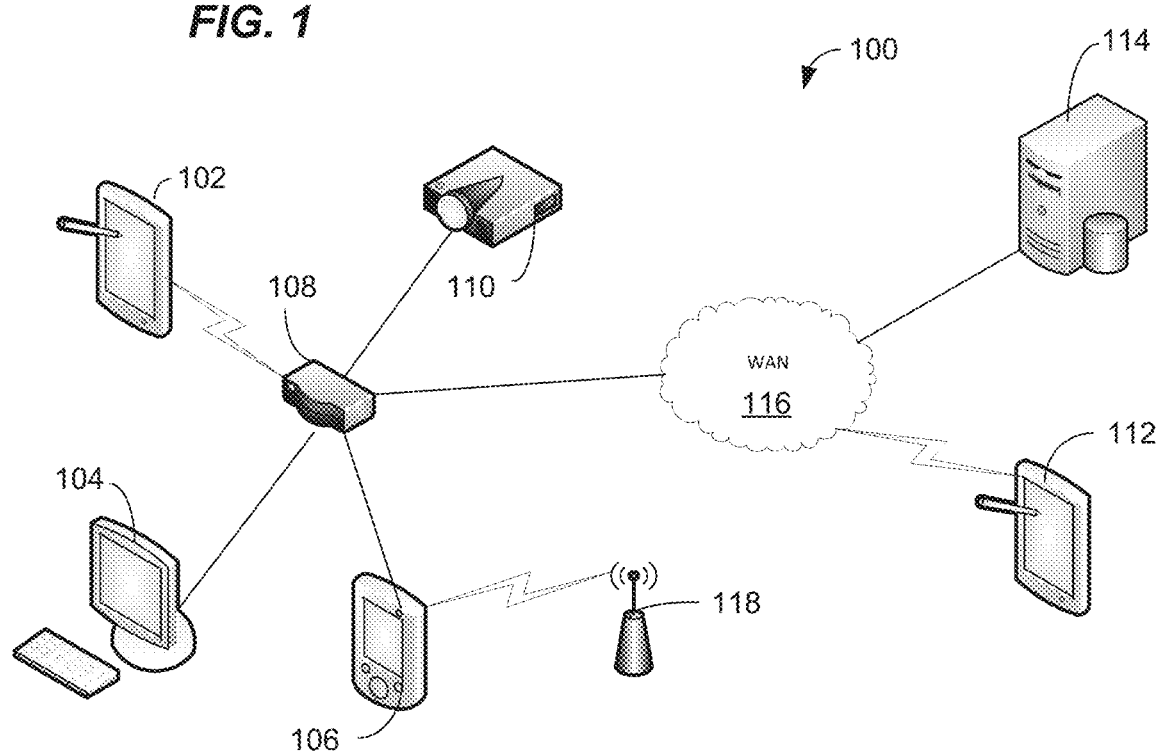
FIG. 1 is a schematic diagram illustrating aspects of a system for implementing methods for protecting data in a storage device.

Referring to FIG. 1, a system 100 illustrates an example of a network context including several different types of computing and/or storage devices 102, 106, 106 coupled via a router/modem 108 and local area network (LAN) or wireless access node 118 for a cellular telephone network to a remote server 114 and remote client 112. By way of non-limiting example, a personal computer 104 may include, or may be coupled to, via a high-speed serial connection or the like, a relatively large secure storage device capable of using a licensable function as described herein to store and provide access to copy-protected content. A consumer of protected content may therefore use the personal computer or a connected external drive, or the like, for holding all or part of the user's media content library. Library content may also be held, via a cloud computing network or other server configuration, in a remote server 114. More portable devices, such as a notepad computer 102 or 112, smartphone 106, or other small form factor computer, may be used primarily for consuming, managing, or purchasing licenses to specific content. Each of these devices may also include a secure storage device able to use a licensable function to protect data in a storage device against unauthorized copying and/or playback by a player device 110 or other content access device (such as the notepad computer 102 or 112 and smartphone 106). A player or content access device may be used primarily for viewing or otherwise accessing content, or may include other components such as a secure storage device for performing other functions. Content player devices may include, for example, flat-screen televisions of various types, digital video projectors, smartphones, notepad computers, wrist watch computers, and any other computing device that includes or is coupled to a suitable audio/video output component. The licensable function capability may be a necessary feature of a security protocol for certain content. Hence, a device with a non-capable storage component may not be able to access certain content, or may be restricted to more limited uses of the certain content.

Figure 2:
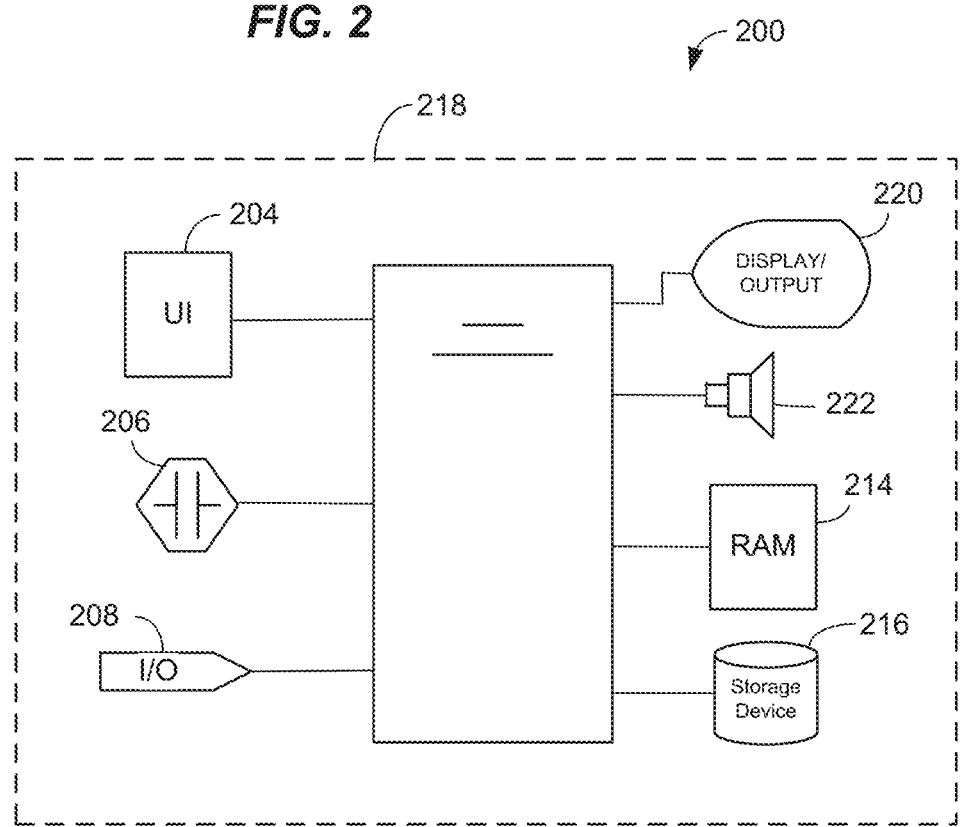
FIG. 2 is a schematic diagram illustrating aspects of an apparatus including a content access device coupled to a storage device.

Referring to FIG. 2, aspects of a computing apparatus 200 for enabling protection of data using a licensable function as described herein are illustrated. In embodiments, the apparatus may be configured as a licensable function generating apparatus. In other embodiments, the apparatus may be configured as a content access device that includes a storage device holding protected content, or as a player device that communicates with an external storage device. In embodiments, the apparatus 200 may be used for video gaming, entertainment, social networking, data processing, user interfacing or other application, and may include, for example, a processor 202, for example a central processing unit based on 80×86 architecture as designed by Intel™ or AMD™, or a system-on-a-chip as designed by ARM™. The processor 202 may be communicatively coupled to auxiliary devices or modules of the licensable function apparatus 200, using a bus or other coupling. Optionally, the processor 202 and some or all of its coupled auxiliary devices or modules (examples of which are depicted at 204-216) may be housed within or coupled to a housing 218, for example, a housing having a form factor of a personal computer, gaming console, smart phone, notepad computer, laptop computer, set-top box, or other form factor. In alternative embodiments, as described above in connection with FIG. 1, the storage device 216 may be in a first device that is communicatively coupled to a second player or content access device, using a session secured at least in part by a licensable function as described in more detail herein below.

A user interface device 204 may be coupled to the processor 202 for providing user control input to a content access process operated by an application executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Input may also be provided via a sensor 206 coupled to the processor 202. A sensor may comprise, for example, a motion sensor (e.g., an accelerometer), a position sensor, a temperature sensor, a location sensor (for example, a Global Positioning System (GPS) receiver and controller), or a microphone. The sensor 206 may detect a motion or other state of a user interface display, for example, motion of a virtual-reality headset, or the bodily state of the user, for example, skin temperature or pulse.

The apparatus 200 may optionally include an input/output port 208 coupled to the processor 202, to enable communication between the processor 202 and a computer network. Such communication may be used, for example, to enable transmittal of secured content from the storage device 216 to a content access device using a session secured at least in part by a licensable function. In the alternative, or in addition, a secure session may be established between the processor 202 and storage device 216, for accessing the content using the display 220 or audio output transducer 222. In other words, a storage device and content access (or player) device may be integrated in a single apparatus, or may be embodied as separate apparatus. The content access may be for any single or multi-user purpose for which the content is licensed, for example, viewing a movie or television program, video gaming, social networking, group entertainment experiences, accessing educational data, accessing proprietary data, and so forth.

A display 220 may be coupled to the processor 202, for example via a graphics processing unit (not shown) integrated in the processor 202 or in a separate chip. The display 220 may include, for example, a flat screen color liquid crystal (LCD) display illuminated by light-emitting diodes (LEDs) or other lamps, a projector driven by an LED display or by a digital light processing (DLP) unit, or other digital display device. The display device 220 may be, or may be incorporated into a virtual reality headset or other immersive display system. Video output driven by a content access application operating on the processor 202 for accessing content secured at least in part by a licensable function, may be provided to the display device 220 and output as a video display to the user (also referred to herein as the "player"). Similarly, an amplifier/speaker or other audio output transducer 212 may be coupled to the processor 202 via an audio processing system. Audio output correlated to the video output and generated by a content access application may be provided to the audio transducer 212 and output as audible sound to the user.

The computing apparatus 200 may further include a random access memory (RAM) 214 holding program instructions and data for rapid execution or processing by the processor during controlling a licensable function. When the apparatus 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium holding program instructions, that when executed by the processor 202, cause the apparatus 200 to perform a method or operations as described herein. Further details regarding secure memory handling are described later in the specification. Program instructions may be written in any suitable high-level language, for example, C, C++, C #, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Licensable functions are cryptographic permutations used for a data protection scheme, which may, for example, include protecting key material that may give/restrict access to digital content. In one embodiment, a licensable function is produced by a licensable function generator, which on input of unique licensee identifiers produces instances (software implementation) of licensee-specific permutations (the licensable functions) that are, in practice, indistinguishable from randomly generated permutations on the set of 128-bit (or other bit length) binary strings. The licensable functions themselves are, in one example, functionally realized based on a N-byte pseudorandom string (for example, where N=416, 336, or 256), which is unique for each licensee, and a set of iterated logical operations based on modular addition, exclusive-OR, circular shift, and permutations on the set of four elements.

Figure 3:
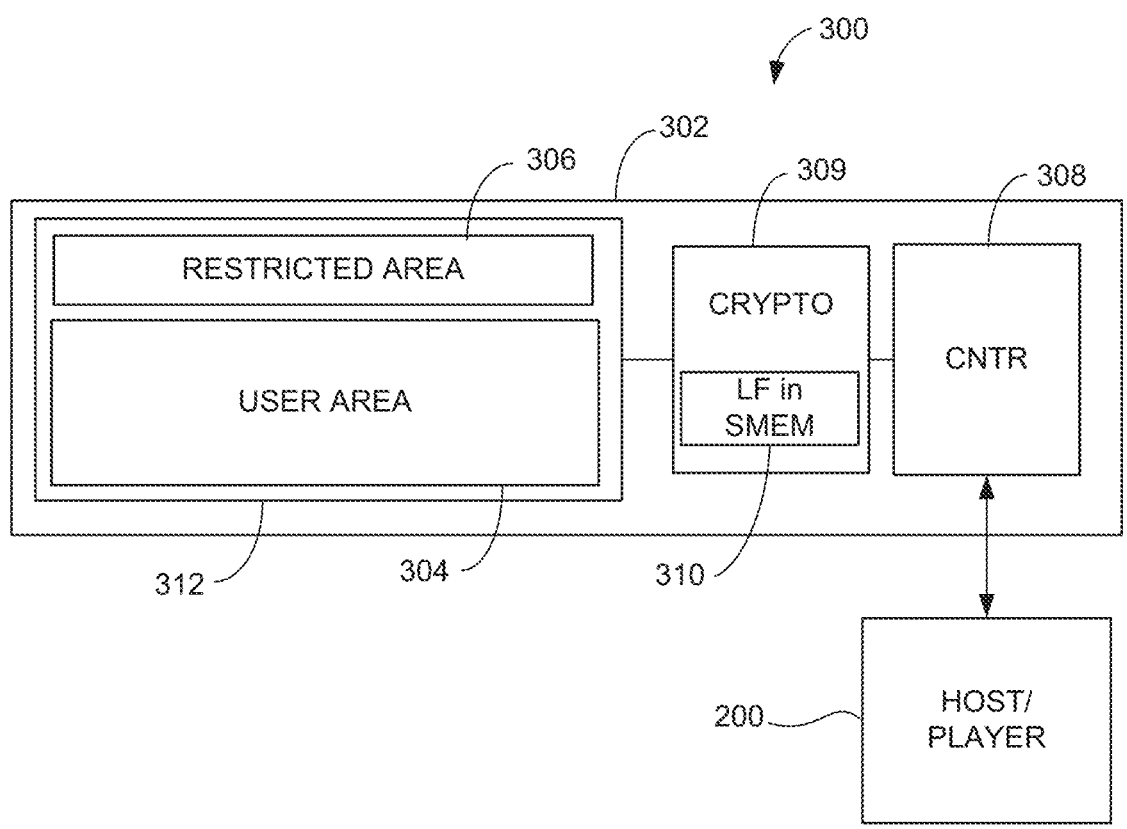
FIG. 3 is a schematic block diagram illustrating aspects of a secure storage device.

Referring to FIG. 3, a system 300 includes a secure storage device 302 communicatively coupled to a content access device, e.g., a host or player apparatus 200. The host or player 200 may be, or may include, for example, a computer, a television, a portable or mobile device, a video game console, or a portable video game console. In an example implementation, the secure storage device 302 includes a "hardware root of trust" by virtue of a hardware cryptographic component 309 that enables playback of certain protected content protected by a cryptographic encoding that cannot be decoded except by the hardware component 309. The component 309 may store a licensable function, for example, in a secure non-volatile memory that is part of the same integrated circuit or chip as the cryptographic component 309. In various embodiments, the cryptographic component 309 may be referred to as a "cryptographic module"; however labeled, the component 309 may include elements of hardware, software, and/or firmware. The storage device 302 including the hardware root of trust may be implemented in nearly any computer device capable of using a storage device and from which it is desired to obtain protected content, for example, including but not limited to media players or in connection with network attached storage ("NAS") controllers.

The secure storage device 302 may include a controller 308 that includes a hardware root of trust as part of a cryptographic processing module 309. The cryptographic processing module 309 may be isolated from the other controller functionality. For example, clear text asymmetric and symmetric key access, and the licensable function operation, may be limited to the cryptographic module 309. Asymmetric and symmetric keys may be generated within the cryptographic module 309, and the licensable function may operate in the cryptographic module 309. Any keys, licensee identifiers or licensable functions, stored outside the cryptographic module 309 may be cryptographically protected. Since licensable function and keys are inside the cryptographic module 309, it is difficult for an attacker to gain access to them. In addition, or in an alternative, the licensable function, keys and other encryption data may be securely stored on the storage device 302, for example, exclusively in a secure manufacturing environment.

The controller 308 may include the hardware and firmware that controls the operation of the storage device 302 and enables communications with the apparatus 200 configured as a host device. The controller 308 may be implemented using known hardware and components for storage devices, for example processor chips and ancillary circuit components. The cryptographic module 309 may be a secure crypto-processor that is configured to perform various cryptographic operations. In one embodiment, cryptographic module 309 may be implemented as an external system-on-chip that is packaged with various security measures to make tamper resistant or tamper-detectable. In another embodiment, a cryptographic module 309 may be implemented as part of or embedded within another system-on-chip or other hardware that is packaged with various security measures to detect tampering and make it tamper resistant. The cryptographic module 309 may be isolated from the other system-on-chip ("SoC") functions, or not isolated.

The cryptographic module 309 may include a secure storage medium 310 where security-sensitive information, including the licensable function, is stored. The secure storage medium 310 may be implemented, for example, as a one-time programmable non-volatile memory ("OTP NVM"). As an OTP NVM, the secure storage medium 310 can only be programmed once and is difficult to alter. In addition, the secure storage medium 310 may also comprise one or more memories, such as a ROM, static RAM, and dynamic RAM.

In addition, the system 300 may include a storage medium 312 for storing content, program instructions and other data. The storage medium 312 may include any suitable computer read/writable physical media used by the storage device 302 to store information, for example, magnetic media, optical media, semiconductor media, such as flash memory, and the like. The storage medium 312 may comprise any useful combination of these media, or other suitable media.

In addition, the storage medium 312 may comprise a user area 304 and a non-user or restricted area 306. The user area 304 may be provided as storage space that is accessible by the host device 200. For example, the user area 304 may be addressable based on logical block addresses ("LBA") used by the host device 200. Content that is protected by the licensable function and/or other encryption may be only in encrypted form, and stored in the user area 304.

The secure storage device 302 may be configured to contain a partition that is secured apart from the user area 304. For example, data in this partition (e.g., restricted area 306) may be encrypted using a separate key generated by the cryptographic module 309. Access to the restricted area 306 may be restricted to authenticated clients or players (such as players running on host device 200). The non-user area 306 is a reserved area of the storage medium 312 that is not directly accessible by the host 200. For example, the non-user area 306 may refer to an area that is not addressable by the host device 200. All or certain data from the restricted area 306 may be accessed only via a secure authenticated channel. The restricted area 306 may be used, for example, for additional content metadata files and information related to content protection and digital rights management (DRM).

The cryptographic module 309 may create new secure keys and allow the storage device 302 to create a secure unique disk encryption key for a special partition area of the medium that is not visible in the user LBA space, such as the restricted (non-user) area 306. The cryptographic module 309 using this key may thus encrypt part or all data written to this area 306.

In an aspect, the non-user area 306 may be used to store secure metadata related to the DRM of system 300. This metadata may include, for example, certificates, key files, license files, etc. For example, the storage device 302 may have a certificate issued to it from a certificate authority server. This certificate may be stored in this non-user area 306 and encrypted with the key for this area. This will bind the certificate to the storage device 302. Thus, if a clone copy of the storage medium 312 is somehow fabricated, the clone will not include the encryption key used for the non-user area 306, and thus, the data stored in this area cannot be correctly decrypted. Alternatively, critical security parameters, such as keys, certificates, or other objects, may be individually cryptographically protected and stored to the storage media. Accordingly, in one embodiment, in order to access content, the controller 308 and the storage medium 312 cannot function separately from each other. In other words, a complete copy of either the controller 308 or the storage medium 312 individually will not be sufficient to access protected content.

Figure 4:
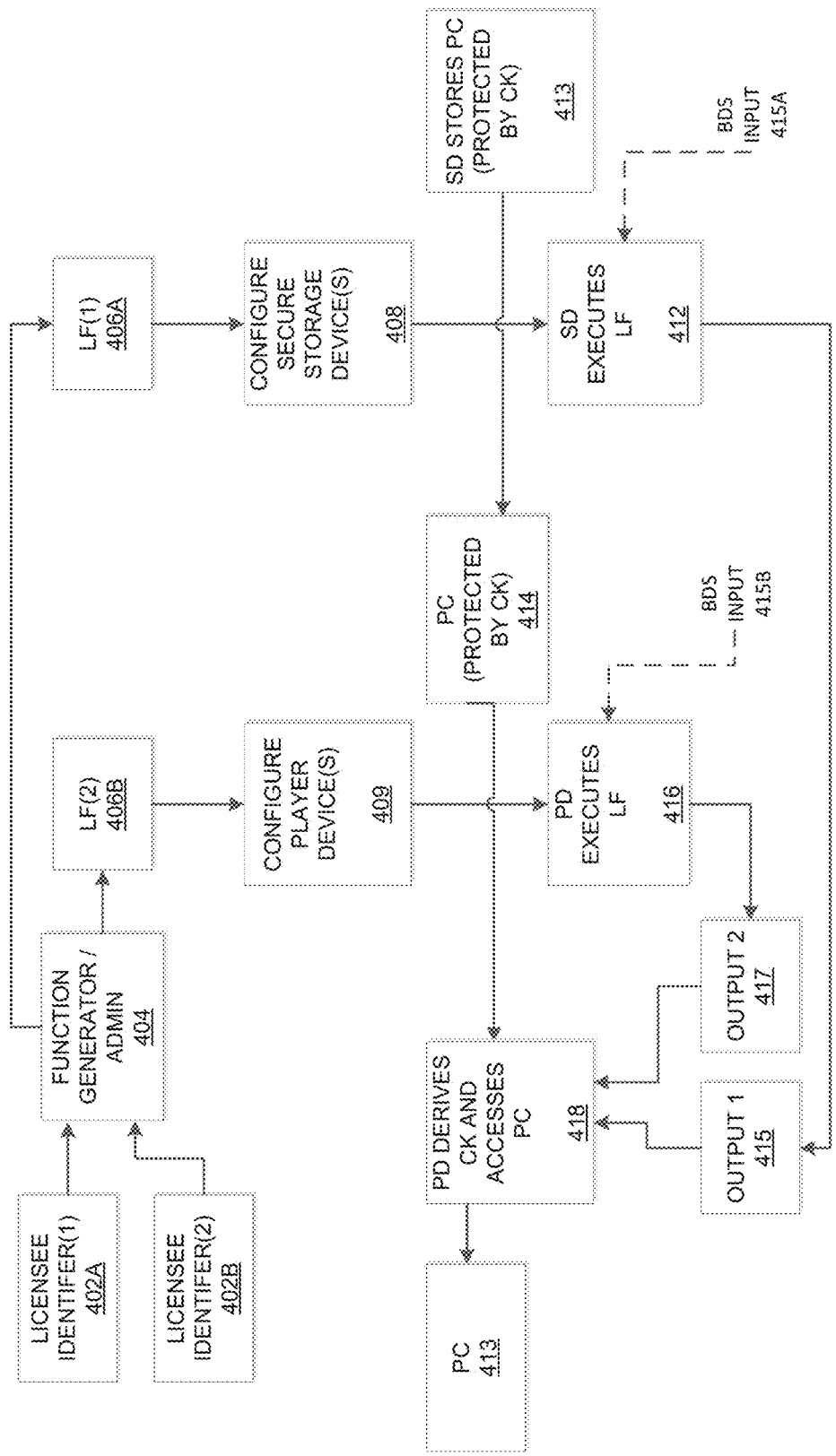
FIG. 4 is a schematic block diagram illustrating aspects of a process for using a licensable function.

Referring to FIG. 4, certain aspects of a process 400 for generating and using a licensable function 406 are illustrated. A licensee identifier 402 (e.g., a number or byte string) is generated and assigned to a licensee, whose identity may be listed in a data base of a system administrator. The licensee may be, for example, a manufacturer of storage devices equipped for use with a secure content protection and distribution system. As used herein, a "licensee" means a person or entity who receives a license, in the present case a license for configuring one or more devices for using a licensable function as described herein. A function generator 404 operated by, for example, a licensee administrator, generates a licensable function ("LF") 406, which as described in more detail below, is a function that permutes data in a way that is uniquely defined by the licensee identifier 402. The licensee configures secure storage devices at 408 with the licensable function 406, for example using a secure memory in a cryptographic module as discussed above in connection with FIG. 3. Possession of the licensable function may be used in a scheme for proving knowledge. For example, a device may derive all, or a portion of, a key for decrypting content, based on output of the licensable function provided with a specific input (e.g., a particular binary data string). A device that does not possess the licensable function for the provided input will be unable, for all practical purposes, to obtain the key needed to decrypt the content. A player device licensee may similarly configure a player device at 409 to use the licensable function to prove knowledge, for example, as part of a key protection scheme to obtain key material that enables playback of secured content.

In various embodiments, the licensable function can be used directly or indirectly (e.g., as one portion of a larger protection regime) to protect key material in used for decrypting content. The key protection scheme may utilize, at least in part, output(s) of a licensable function at the storage device, the player device, and/or both. FIG. 4 provides a simple example where once each secure storage device (not shown) has been configured and is put in use to store protected content ("PC") 413 that has been protected by a cryptographic key ("CK") that is related to the licensable function in a special way. For example, a portion of the cryptographic key, or the entire cryptographic key, can be derived from output(s) from one or more licensable functions, each operating upon a particular data input known (or made known) to the storage device, or to the player device, whichever the case may be. The particular data input may be, for example, a particular binary data string ("BDS") 415. As shown, BDS 415A is an input provided to the storage device (e.g., from a license server or an administrative node that tracks the licensable function, associated BDS 415 and/or any output post application of the LF that correspond to each licensee identifier, be it player or storage device), and the application of the licensable function on BDS 415A may be result in an output that can be used to prove knowledge. The same applies for BDS 415B for the licensable function for the player device.

As a result of the configuration at 409, the player device or component may also have the licensable function 406B in, for example, a secure memory. In this example, the player device at 416 executes the licensable function using the BDS 415B as input, thereby deriving an output 417 that can be used to obtain the cryptographic key. For example, an output 417 may be used to decrypt an output 415 received from the storage device, which may contain key material that has been decrypted or otherwise recovered based on result the storage device's execution of the licensable function on BDS 415A at 412. The result of applying output 417 to output 415 may then be used directly or indirectly to obtain the cryptographic key needed to access the protected content. In other examples, the output 415 and 417 may be applied differently to obtain key material to decrypt protected content. In this manner, the licensable functions are applied to prove knowledge and thereby protect key material as part of a content protection scheme.

Regardless of how the licensable functions in the storage device and player are used to protect the key material, once the key is derived the player device can then use the cryptographic key to decrypt the encrypted content 414 and obtain the protected content 413. It should be apparent that other cryptographic measures may be applied in addition to the licensable function, without disrupting the utility of the licensable function itself. For example, protected content may be encrypted by the cryptographic key while it is in encrypted form based on a different key. In such case, the protected content 413 would still need to be decrypted again before it can be decoded and used by the player device or component. Details of such additional protection are beyond the scope of the instant disclosure, and any suitable process may be used in conjunction with the licensable function.

More detailed aspects of generating a licensable function 406 are discussed below. Although cryptographic algorithms are commonly employed for allowing and/or restricting access to digital content, the idea of having licensable pseudorandom permutations produced by a tool is believed to be novel in the digital content provider industry. As for the algorithmic specification of the licensable functions, the design follows well-studied cryptographic principles, such that the logical operations employed allow one to classify licensable functions as members of the family of the so-called Addition, Rotation and eXclusive-or (ARX) based cryptographic functions. Other notable examples include the Skein hash function (http://www.skein-hash.info/sites/default/files/skein1.3.pdf), and the SipHash MAC algorithm (https://131002.net/siphash/). These algorithms are however used for goals which are very distinct from the licensable functions (namely, hashing and message authentication).

Some embodiments of the disclosed methods involving the licensable function algorithm make use of the Addition, Rotation and eXclusive-or operations in unique and original ways.

Figure 5:
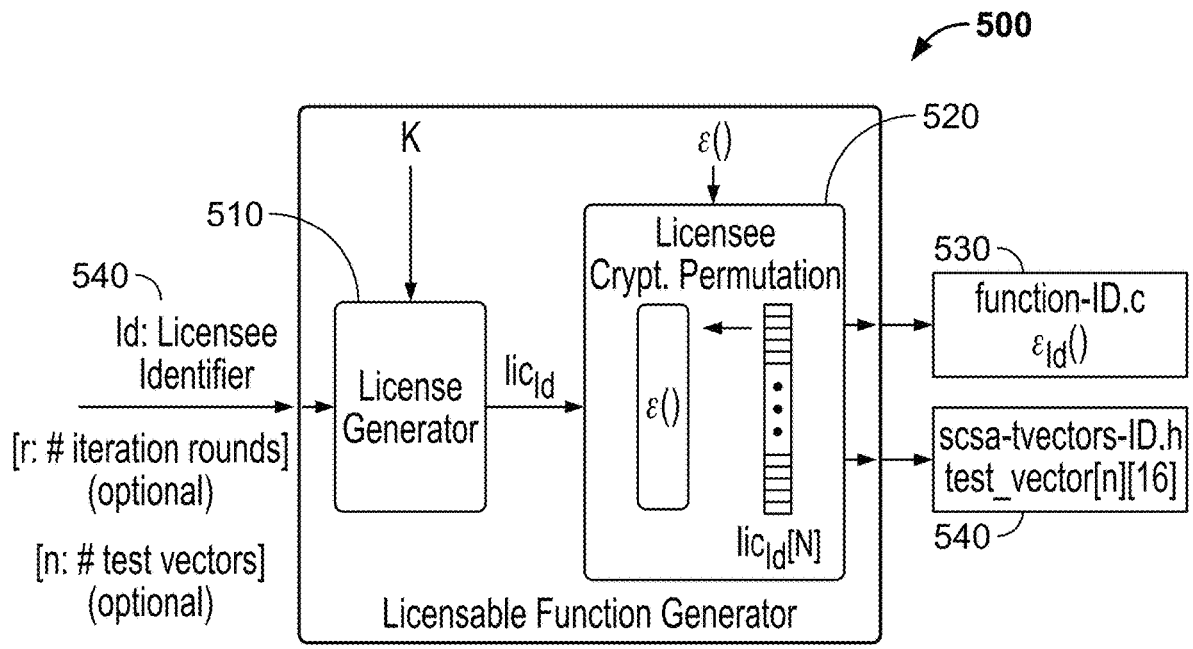
FIG. 5 is a schematic block diagram illustrating aspects of a licensable function generator process.

A diagram showing the licensable function generator 500 architecture according to one embodiment is shown FIG. 5. The licensable function generator 500 in one embodiment produces licensee-specific cryptographic functions (the licensable functions), which can be used to protect the confidentiality of digital inputs within licensee systems and devices, for example digital keys or content. In embodiments, upon becoming a licensee, a manufacturer will obtain access to the licensee-specific licensable function. Each such licensee may be required to implement their assigned version of the licensable functions by an accompanying security protocol specification. Within licensee systems, the licensable functions may be used, for example, for protecting key material that may give or restrict access to digital content.

In one or more embodiments, the licensable function generator algorithm takes as input licensee-specific information in the form of a unique identifier to produce cryptographic functions that offer a suitable level of security for their intended use. The design is based on robust cryptographic principles, such that, functionally, the output of the function generator is in practice indistinguishable from permutations on the set of binary strings (for example, a set of 128-bit strings) that are generated independently and at random.

The function generator 500 may be designed to be implemented as any computer program or process, e.g., a command line tool, or a part of a larger computer program or process. The function generator 500 in one embodiment takes as input an identifier 540 (e.g. a 128-bit data word) associated with each licensee in a system data table, and produces as output a licensee-specific cryptographic permutation as a function (530). The produced function may be implemented in some suitable form, for example as source code in 'C' or other programming language, as compiled executable code, or as pseudo-code suitable for translating into one or more programming languages. The licensee identifiers may be defined by an administrator of the content security system using the licensable function, and each one may be associated to a specific licensee, who is generally a manufacturer or distributor of storage devices. The function generator may also make use of a string, denoted by K, which may, for example, have a fixed length of 16-bytes and is assumed to be kept secret from the licensee. The string 'K' is also referred to herein as a "system key." The system key may be generated by a function controlled by a security system operator, and as such, may not be known or easily discoverable by any person.

The licensable function generator algorithm 500 may include at least two component algorithms: a license generator algorithm 510 and a licensee cryptographic permutation algorithm 520. The license generator algorithm 510 may have one main parameter, namely a number of rounds R (shown as lower case "r" in FIG. 5). For example, values allowed may include 20, 16 and 12, though other values may be used. A second parameter $d \in \{4,6\}$ may have a fixed value, for example, four, in an embodiment of the algorithm. Given R and d, a third number N may be computed as $N=16*(R+1)+d*R$. Possible values for N are therefore 416, 336 and 256, for R=20, 16, and 12 respectively. The choice of the parameter R determines the specific trade-offs between the security and efficiency of the licensable functions. Greater values of R increase the complexity of the permutation and consume more computational resources or time. With a fixed string K (e.g., a 16-byte string), the algorithm takes as input a 128-bit licensee identifier Id, and produces a pseudorandom N-byte string $\text{lic}_{Id}$. This string may be thought as a license to the licensee with identifier Id; it is the output of the license generator 510 and will enable the licensee to implement the corresponding licensable function.

The license generator 510 may use a SipHash-4-8 Message Authentication Code (MAC) algorithm as a pseudorandom function, with K as the MAC key, and the 17-byte string (i∥Id) as input (using the same example above, concatenating a 1 byte i to the 128-bit (16-byte) licensee identifier Id). The MAC algorithm may be computed on a loop, with i set to the loop counter, to produce the string $\text{lic}_{Id}$ of length N bytes. The cryptographic construction may include using a pseudorandom function (PRF) in counter mode to produce a long string of pseudo-random bytes, and may be based on the Key Derivation Function (KDF) in counter mode defined in the National Institute of Standards & Technology (NIST) recommendation for key derivation functions.

Since it is derived from the licensee identifier Id, this string $\text{lic}_{Id}$ will be unique for each licensee, and will parameterize the licensee-specific permutations. This N-byte string forms the basis of the licensable function, and can, in one example implementation, be hard-coded in the C implementation output by the licensable function generator.

The licensee cryptographic permutation generator algorithm 520, in turn, produces the licensable functions, e.g., licensable function 530. In one embodiment, this algorithm makes use of the string $\text{lic}_{Id}$ and a set of iterated logical operations which may be, for example, based on modular addition, exclusive-OR, circular shift, to permute elements of an input string. Different combinations of the iterated logical operations are used to operate on particular data elements of the input string or other data to be processed, to functionally implement the licensee-specific pseudorandom permutations. For example, input data may be broken down into different subsets of equal or varying size, each of which is processed by a different one of the logical operations. If implemented in this manner, the algorithm could be classified as a member of the family of so-called ARX-based cryptographic functions. A detailed specification of all the operations in the licensee cryptographic permutation is provided in the description below.

In one embodiment, a licensee-specific licensable function 530 is an implementation of the licensee cryptographic permutation parameterized by the corresponding license (namely, the N-byte string $\text{lic}_{Id}$). The licensable function generator 500 produces such an implementation, on input of the corresponding licensee identifier Id. The licensable function 530 may be provided in the form of a C language implementation that can be integrated into licensee content protection mechanisms, or other suitable form for providing executable code. In one example, the licensable function 530 then takes as input a 128-bit input X, to produce another 128-bit output Y, such that Y=σ(X), where σ is the pseudorandom permutation defined by $\text{lic}_{Id}$. As shown in FIG. 5, the licensable function generator 500 itself may also take an optional input n, which defines a number of test vectors 540 to be produced by the licensable function generator 500.

The licensable function generator 500 may be implemented in C or other suitable programming language as a command line tool that, on input of a 128-bit licensee identifier, generates the corresponding licensee-specific cryptographic permutation (the licensable function) and outputs its C-based (or other programming language-based) reference implementation. The tool may also produce test vectors 540 that can be used to verify the implementation of the cryptographic permutation.

As noted above, the licensable function 530 (which may also be referred to as a cryptographic permutation function) is an output of the licensable function generator 500. The following three operations may be used to describe the licensable function. The present technology is not limited to the particular values provided in the examples below:

1. A operation: given as input the state $X=[X_0, X_1, X_2, X_3]$, where $X_i$ is a 32-bit integer, and a 128-bit string $\mathcal{L}$, convert $\mathcal{L}$ into a 32-bit word array $[\mathcal{L}_0, \mathcal{L}_1, \mathcal{L}_2, \mathcal{L}_3]$, where $\mathcal{L}_i$ are 32-bit strings representing integers between 0 and $2^{32}-1$ (using the big-endian byte ordering). Then define A as:

$$A(X, \mathcal{L}) = [X_0 \boxplus \mathcal{L}_0, X_1 \boxplus \mathcal{L}_1, X_2 \boxplus \mathcal{L}_2, X_3 \boxplus \mathcal{L}_3]$$

Thus A may be, for example, a simple addition modulo $2^{32}$, operated on each of the 32-bit words of the state X and $\boxplus$.

2. Π operation: given as input a 128-bit state $X=[X_0, X_1, X_2, X_3]$ and a permutation Π on the set $\Omega=\{0, 1, 2, 3\}$, define Π as $$\Pi(X, \pi) = [X_{\pi(0)}, X_{\pi(1)}, X_{\pi(2)}, X_{\pi(3)}].$$

Thus Π simply permutes the four 32-bit words of X. The permutation π may be selected in a set of size 16, for example as shown in the table 610 of FIG. 6A. It can therefore be represented by a 4-bit value also denoted by π. The permutations shown in the table 610 are given in standard cycle notation, where the successive entries in each cycle are obtained by repeated applications of the permutation, and values which don't appear are taken to be in a cycle of length 1. So for example, the permutation (012) maps 0 to 1, 1 to 2, 2 to 0, and fixes 3.

3. S operation: given two 32-bit words $X_0$ and $X_1$ as input, and an integer $r \in \{11, 13, 17, 21\}$, let $X<<<_r$ denote the cyclic rotation of the 32-bit word X by r bits. Then let S be defined as $$S([X_0, X_1], r) = [X_0 \oplus ((X_0 \boxplus X_1)<<<_r), (X_0 \boxplus X_1)].$$

Figure 6C:
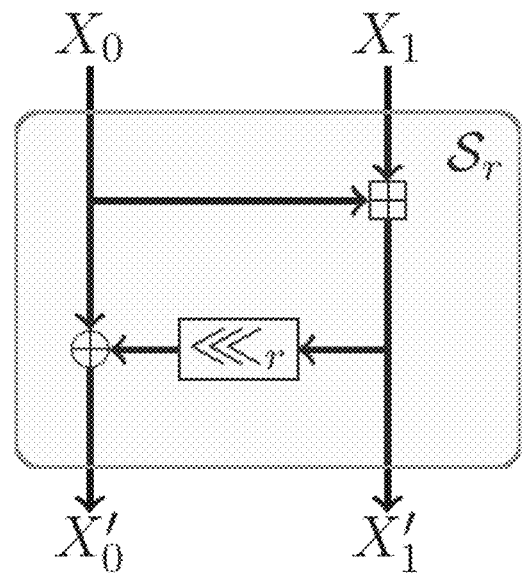
FIG. 6C is a schematic diagram illustrating a rotation aspect of a licensable function.

Since there are four possible values for r, the rotation can be associated with a 2-bit value; the selection of the value r may be given by a rotation table 620, for example as shown in FIG. 6B. The rotation 630 $S([X_0, X_1], r)$, which may be denoted by $S_r([X_0, X_1])$, as shown in FIG. 6C, results in the two 32-bit rotated word output $X'_0, X'_1$.

If, for example, $R \in \{20, 16, 12\}$ is the number of rounds of the licensable function, then $\text{lic}_{Id}$ is a N-byte string, where $N=16\cdot(R+1)+d\cdot R=20\cdot R+16$, in an embodiment where d=4 is fixed. In such case, for the default value R=20, $\text{lic}_{Id}$ (the output of the license generator 510) is a 416-byte string. Now, let L be a byte string of length at least 20 bytes (160 bits). The round derivation function $f$ can be defined as a representation of the leftmost 160-bit substring of L as $$f(L) = [[\mathcal{L}_0, \mathcal{L}_1, \mathcal{L}_2, \mathcal{L}_3], [r_{0,0}, r_{0,1}, \pi_0], [r_{1,0}, r_{1,1}, \pi_1], [r_{2,0}, r_{2,1}, \pi_2], [r_{3,0}, r_{3,1}, \pi_3]],$$

where $\mathcal{L}_i$ are 32-bit substrings of L, while $[r_{i,0}, r_{i,1}, \pi_i]$ are 2+2+4 8-bit substrings of L ($r_{i,0}$ is the least significant 2 bits of the byte $[r_{i,0}, r_{i,1}, \pi_i]$). Thus f(L), in the foregoing example, is a binary string with $4\cdot32+8+8+8+8=160$ bits.

Now given the string $\text{lic}_{Id}$, a pointer $p \geq 0$ may be defined to move across the byte string $\text{lic}_{Id}$, so that $\text{lic}_{Id}[p]$ is the substring of $\text{lic}_{Id}$ starting at the $p^{th}$ byte of $\text{lic}_{Id}$ (in particular, when p=0, $\text{lic}_{Id}[\text{ptr}]$ is the full string $\text{lic}_{Id}$). The licensable function $E_{Id}$ can then be described as in the example algorithm described below:

Example Algorithm $E_{Id}$

```
Input: P = [P₀, P₁, . . . , P₁₄, P₁₅] a 16-byte string
Output: E_Id(P) = C = [C₀, C₁, . . . , C₁₄, C₁₅] a 16-byte string
1:   [X₀, X₁, X₂, X₃] ← [P₀, P₁, . . . , P₁₄, P₁₅]
2:   p ← 0
3:   for i = 1 → R do                     ▷ R = 20 by default
4:      [[𝓛₀, 𝓛₁, 𝓛₂, 𝓛₃], [r₀,₀, r₀,₁, π₀], [r₁,₀, r₁,₁, π₁ ], [r₂,₀, r₂,₁, π₂ ], [r₃,₀,
        r₃,₁, π₃]] ← f(lic_Id[p])
5:      [X₀, X₁, X₂, X₃] ← A(X, 𝓛) = [X₀ ⊞ 𝓛₀, X₁ ⊞ 𝓛₁, X₂ ⊞ 𝓛₂, X₃ ⊞ 𝓛₃]
6:      for j = 0 → 3 do
7:         [X₀, X₁] ← S_{r_j,0} ([X₀, X₁]) = [X₀ ⊕ ((X₀ ⊞ X₁) <<<r_j,0), (X₀
           ⊞ X₁)]
8:         [X₂, X₃] ← S_{r_j,1} ([X₂, X₃]) = [X₂ ⊕ ((X₂ ⊞ X₃) <<<r_j,1), (X₂
           ⊞ X₃)]
9:         [X₀, X₁, X₂, X₃] ← Π(X, π_j) = [X_{πj(0)}, X_{πj(1)}, X_{πj(2)}, X_{πj(3)}]
10:     end for
11:     p ← p + 20
12:  end for
13:  [𝓛₀, 𝓛₁, 𝓛₂, 𝓛₃] ← lic_Id[p]
14:  [X₀, X₁, X₂, X₃] ← A(X, 𝓛) = [X₀ ⊞ 𝓛₀, X₁ ⊞ 𝓛₁, X₂ ⊞ 𝓛₂, X₃ ⊞
     𝓛₃]
15:  return C ← [X₀, X₁, X₂, X₃]   ▷ X interpreted as a 16-byte
     string
```

The example algorithm acts on a state X of four 32-bit integers. Thus the first step of the algorithm is to convert the 16-byte input P into X. This conversion is done using the big endian byte ordering convention. Thus, if the first four bytes of P are 0xFF, 0x66, 0xBB, 0x11, then the first word $X_0$ of X will be 0xFF66BB11.

Figure 6D:
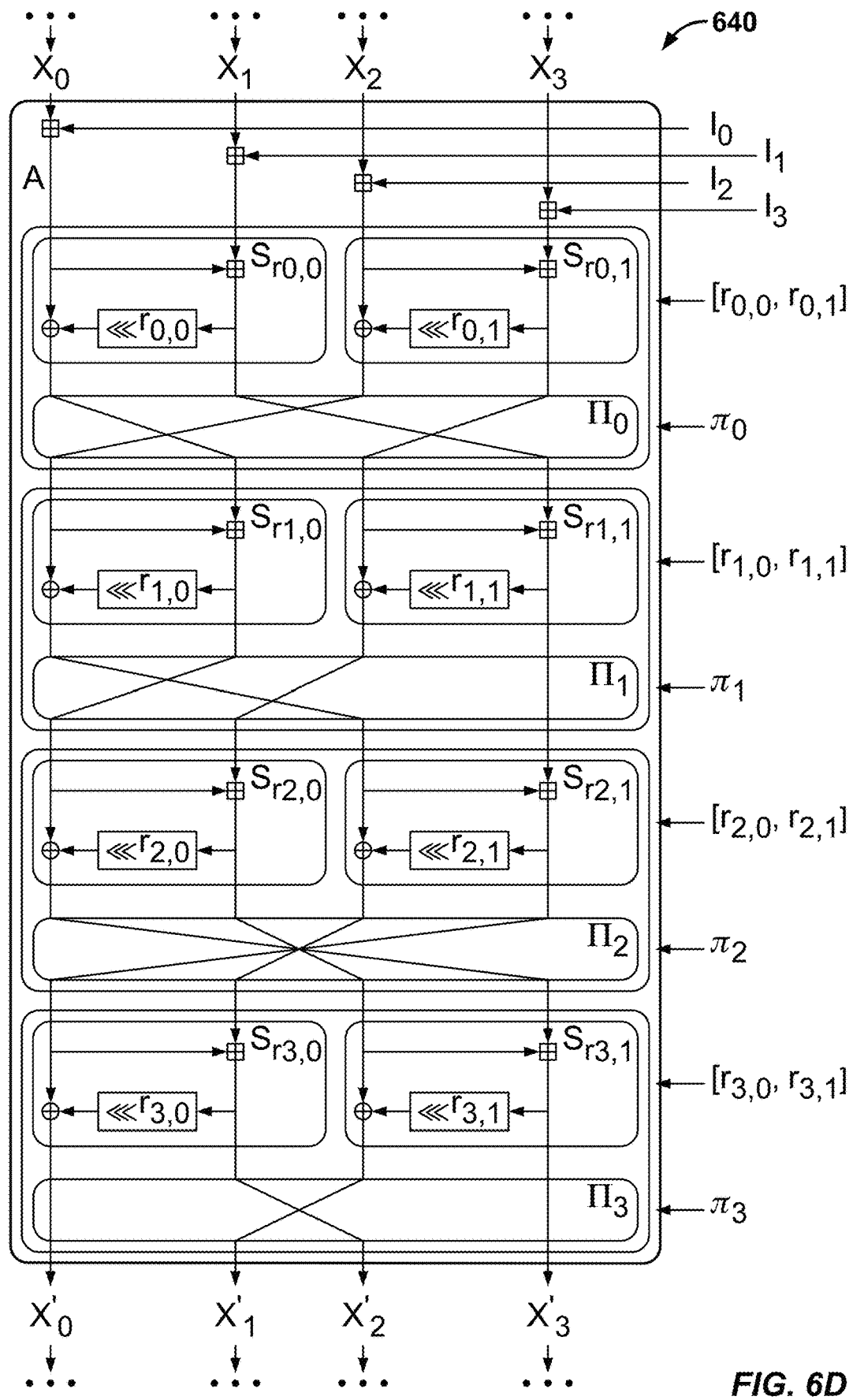
FIG. 6D is a schematic diagram illustrating one operational round of a licensable function.
Figure 7:
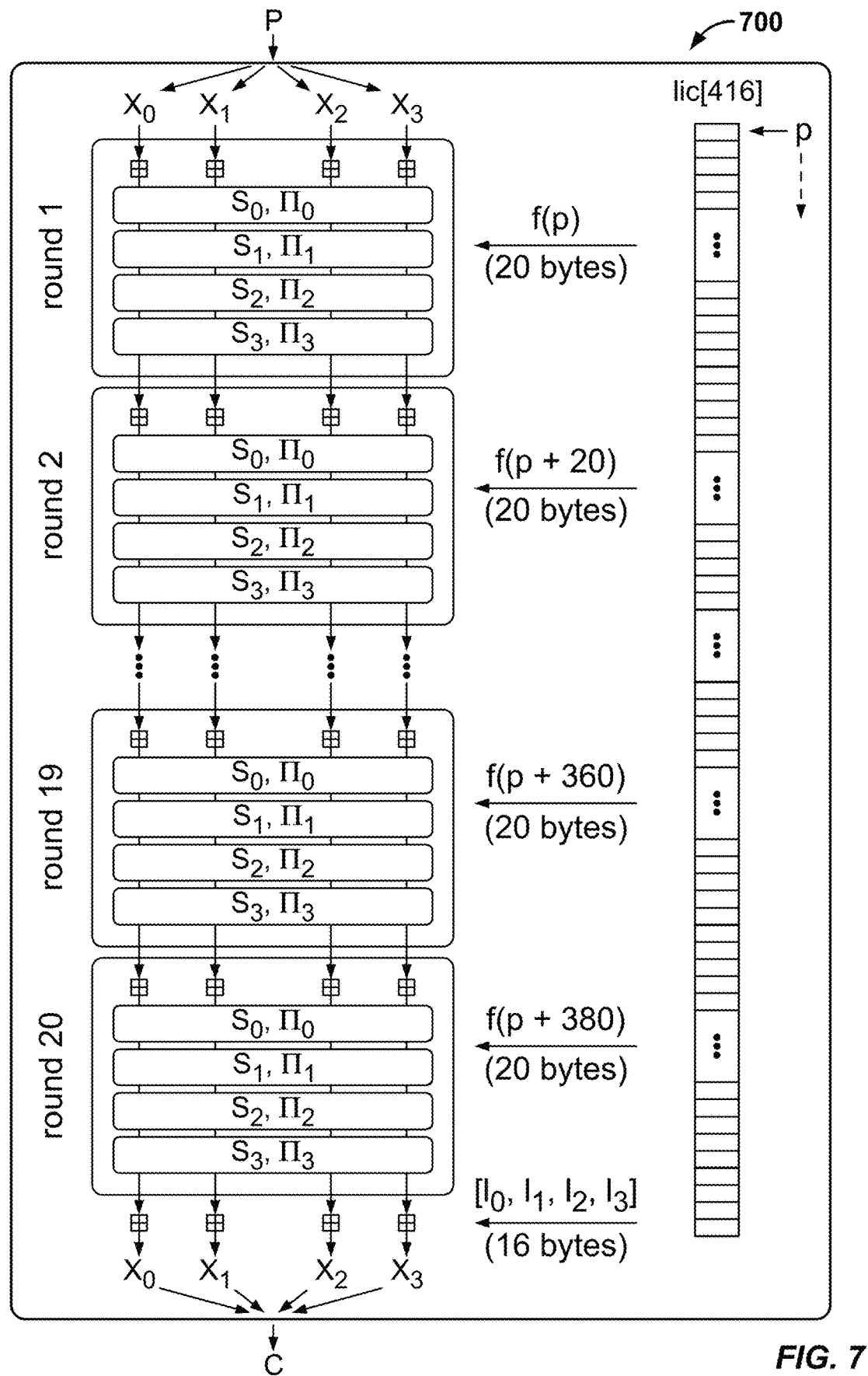
FIG. 7 is a schematic diagram illustrating operation of a licensable function.

In one example implementation, the algorithm then repeatedly extracts bytes from the N-byte string $lic_{Id}$ to define an iteration of the operations A, Π and S: with the proposed parameters, the algorithm runs for R rounds, and each round uses 20 bytes of $lic_{Id}$ to perform an addition operation A and to define a 4-iteration of the S and Π operations (with the rotation values and permutation choices being determined by $lic_{Id}$). One round 640 of $E_{Id}$ is depicted in FIG. 6D. The algorithm ends with a final A operation, with the result interpreted as a 16-byte string C using the big endian byte ordering convention. Thus, if the first 32-bit word of the final state X is 0x1812BB00, the first four bytes of C will be 0x18, 0x12, 0xBB, 0x00. An example of a licensable function 700 diagrammed in full is depicted in FIG. 7, wherein R=20 and N=416.

In one Licensable Function Generator implementation, the licensee-specific permutations will be output as, for example, a C implementation file of the algorithm $E_N$, with the corresponding N-byte string $lic_{Id}$ which may be fixed and/or hard-coded. Each licensable function $E_{Id}$ may transform any 128-bit input to a 128-bit output under the control of a $lic_{Id}$ value using the algorithm defined above. In an example implementation, the algorithm only uses ARX components, with a 32-bit word size: that is, it is based on operations on 32-bit words involving Addition mod $2^{32}$, 𝓛; cyclic Rotation of words by r-bits, <<<r, and eXclusive-or, ⊕. The choice for an ARX design for this example licensable function implementation is due to, among other reasons, its compact implementation and good performance in software. The simplicity and popularity of the design may also enable more confident claims about the algorithm's security properties. However, the present technology is not limited to use of ARX, and other permutation algorithms may also be suitable.

Figure 10:
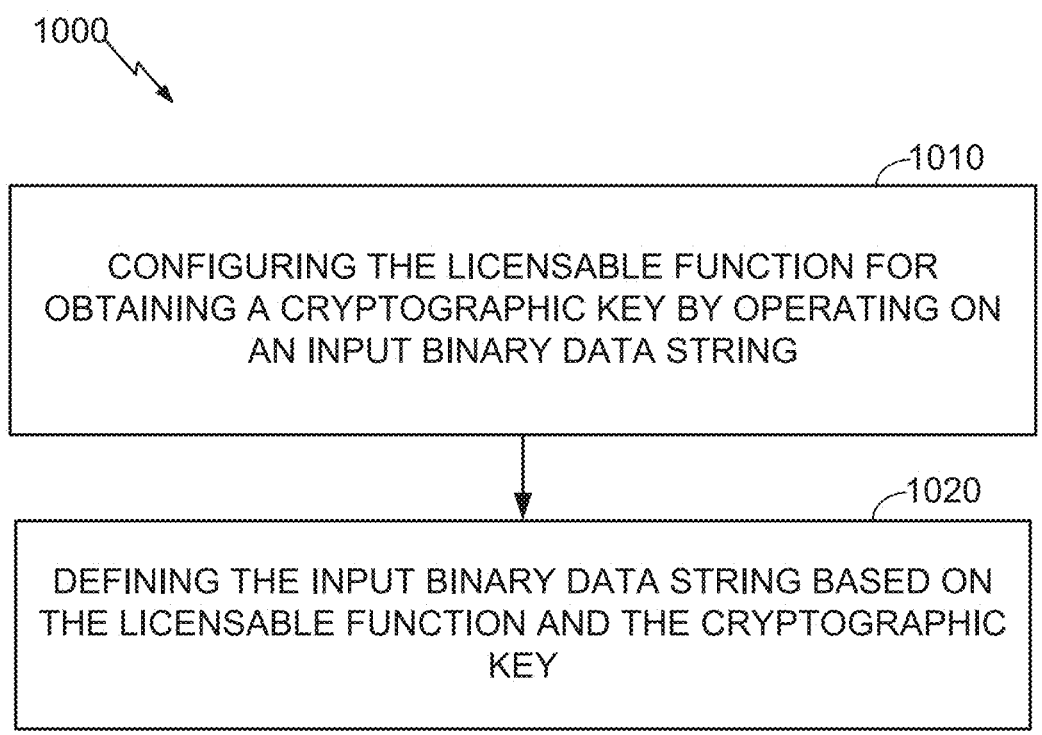

In accordance with the foregoing, and by way of additional example, FIGS. 8-10 show aspects of a method or methods 800, as may be performed for configuring a storage device as described herein. Referring to FIG. 8, a computer-implemented method 800 for enabling secure electronic transmission of data from a storage device may include, at 810, defining a licensee identifier comprising binary data recorded in a computer memory. For example, the binary data may be, or may include, a character string or byte string. The method 800 may further include, at 820, automatically generating, by a processor, a plurality of machine instructions for a cryptographic permutation function (referred to as "licensable function" above), at least in part by providing the licensee identifier to an instruction-generating algorithm. A detailed example of one suitable instruction-generating algorithm is provided by the licensable function generator described and shown at 520 of FIG. 5. The machine instructions may include, for example, source code, executable binary code, or pseudo code. The method 800 may further include, at 830, providing at least one of the instructions or an executable function compiled from source code based on the instructions to the licensee (e.g., to an administrator for the licensee) for use in transforming (e.g., protecting) electronic data transmissions for one or more devices associated with the licensee identifier. The one or more devices associated with the licensee identifier may be, or may include a storage device; for example, one or more of an SSD, a hard disk drive, a USB memory stick, or a flash memory reader and card. In addition, the one or more devices may include a player device; for example a media streaming device, a "smart TV," a physical media player, or a player component of a mobile or desktop computer or smart phone. Providing the instructions 830 may include, for example, storing the licensable function in an executable form in a secure non-user area of a secure storage device cryptographic module.

The method 800 may include any one or more of additional operations 900 or 1000, shown in FIGS. 9 and 10, in any operable order. Each of these additional operations is not necessarily performed in every embodiment of the method, and the presence of any one of the operations 900 or 1000 does not necessarily require that any other of these additional operations also be performed.

Referring to FIG. 9, an aspect 910 of the method 800 may include generating the plurality of instructions for implementing the cryptographic permutation function may be based on a pseudorandom byte string, wherein operation of the cryptographic permutation function when compiled and executed by a processor is uniquely determined by the pseudorandom byte string. A byte string may include, for example bytes representing one or more characters (e.g., a character string), bytes that do not represent any character, or both. For example, the cryptographic permutation function may be, or may include, "Addition, cyclic Rotation and eXclusive or" (ARX) components. In a related aspect, values controlling the addition, rotation, and "exclusive or" components of the permutation function may be determined based on the pseudorandom byte string that is, in turn, a pseudorandom function of the licensee identifier.

In another aspect, the method 800 may include, at 920, generating the pseudorandom byte string by a string-generating algorithm based on the licensee identifier, wherein the pseudorandom byte string is unique to the licensee identifier. For example, the string-generating algorithm may take a system key and the licensee identifier as inputs, as shown in FIG. 5. As used herein, "unique to the licensee identifier" includes being "in general unique to the identifier" or "practically unique," and does not require a mathematically perfect degree of uniqueness. The term "system key" is intended to merely label the referenced key to avoid confusion with other keys, and not to limit aspects of the system key itself.

In another aspect 930, the method 800 may include recording at least one of the licensee identifier, the plurality of instructions, the executable function, or the pseudorandom byte string in an electronic database, in association with identifying information for licensee, for example contact and identity information for an administrator of the licensee.

Referring to FIG. 10, the method 800 may further include, at 1010, configuring the licensable function for obtaining a cryptographic key by operating on an input binary data string. For example, the method 800 may include, at 1020, defining the input binary data string based on the licensable function and the cryptographic key. In other word, the licensable function that is generated belongs to a class of functions that generate a cryptographic key, or a cryptographically significant portion of the key, based on a specific byte string input. The licensee identifier and at least one of the associated licensable function or the input binary data string may be provided to a secure administrative server for configuring one or more trusted devices to decrypt content from the one or more devices associated with the licensee identifier. A trusted device may include, for example, a trusted content player device module, or other content access node, which may be coupled to the storage device by any one or more of a bus or bridge, a serial connection, a local area network, or a wide area network.

With respect to the foregoing operations 1000, devices participating in a session secured by a licensable function may be required to each possess a known licensable function. For example, each device may be associated with a licensee identifier, which may be passed to a secure administrative server when establishing a secure session. The secure administrative server may look up or otherwise discover a licensable function associated with the licensee identifier, and/or a specific input that when provided to associated licensable function will generate a particular cryptographic key, or generate an output that can be used as part of an input to a key protection scheme to obtain the key. Hence, each device may be required to possess the appropriate licensable function associated with its identifier to successfully pass a proof-of-knowledge test for gaining access to protected content. For example, a device may be required to derive all, or a portion of, a key for decrypting content, based on output of the licensable function when provided with a specific input (e.g., a specific byte string). A device that does not possess the licensable function for the provided input will be unable, for all practical purposes, to obtain the cryptographic key needed to decrypt the content from a storage device (or other source device). Thus, even if the provided input byte string falls into unauthorized hands, the content cannot be accessed except by a device possessing the specific licensable function that generates the cryptographic key or a necessary portion of it based on the input byte string.

Figure 11:
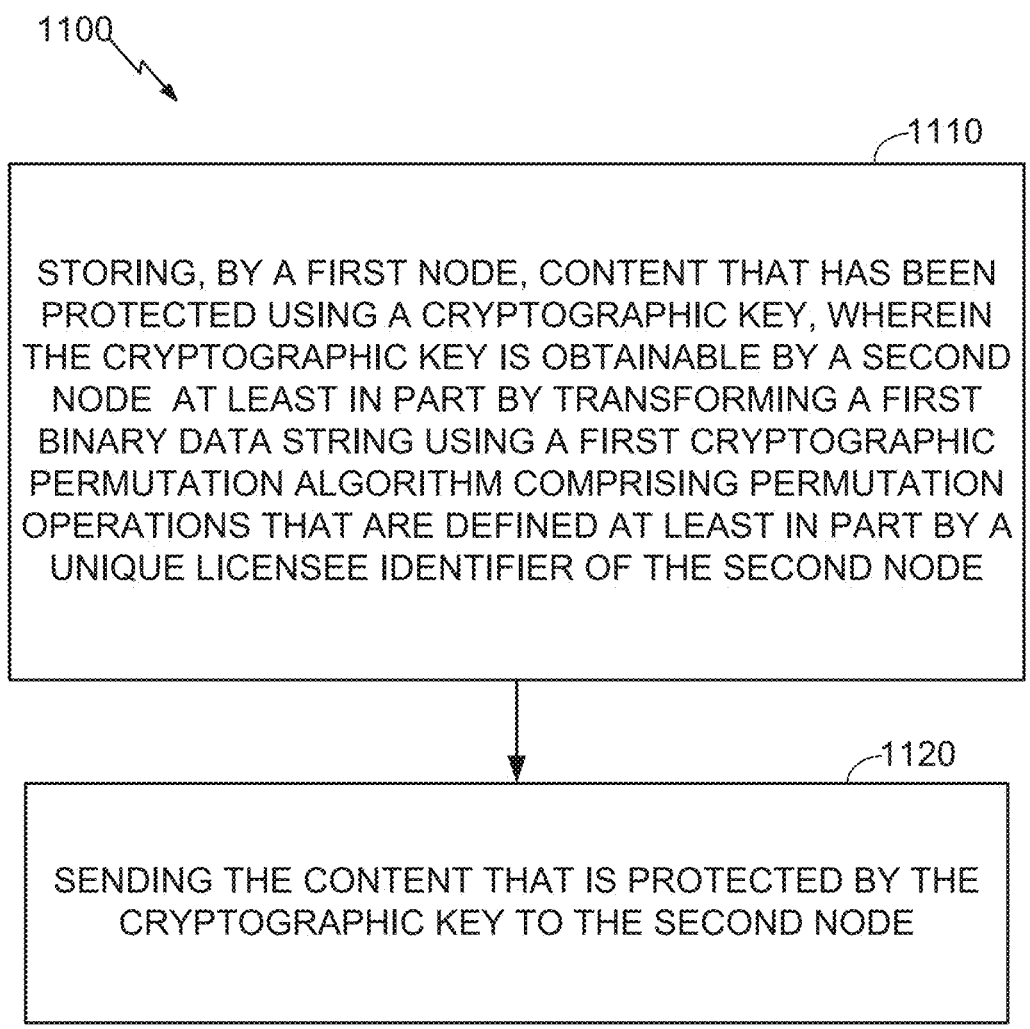
FIG. 11 is a flow chart illustrating a method for protecting content using a licensable function.
Figure 12:
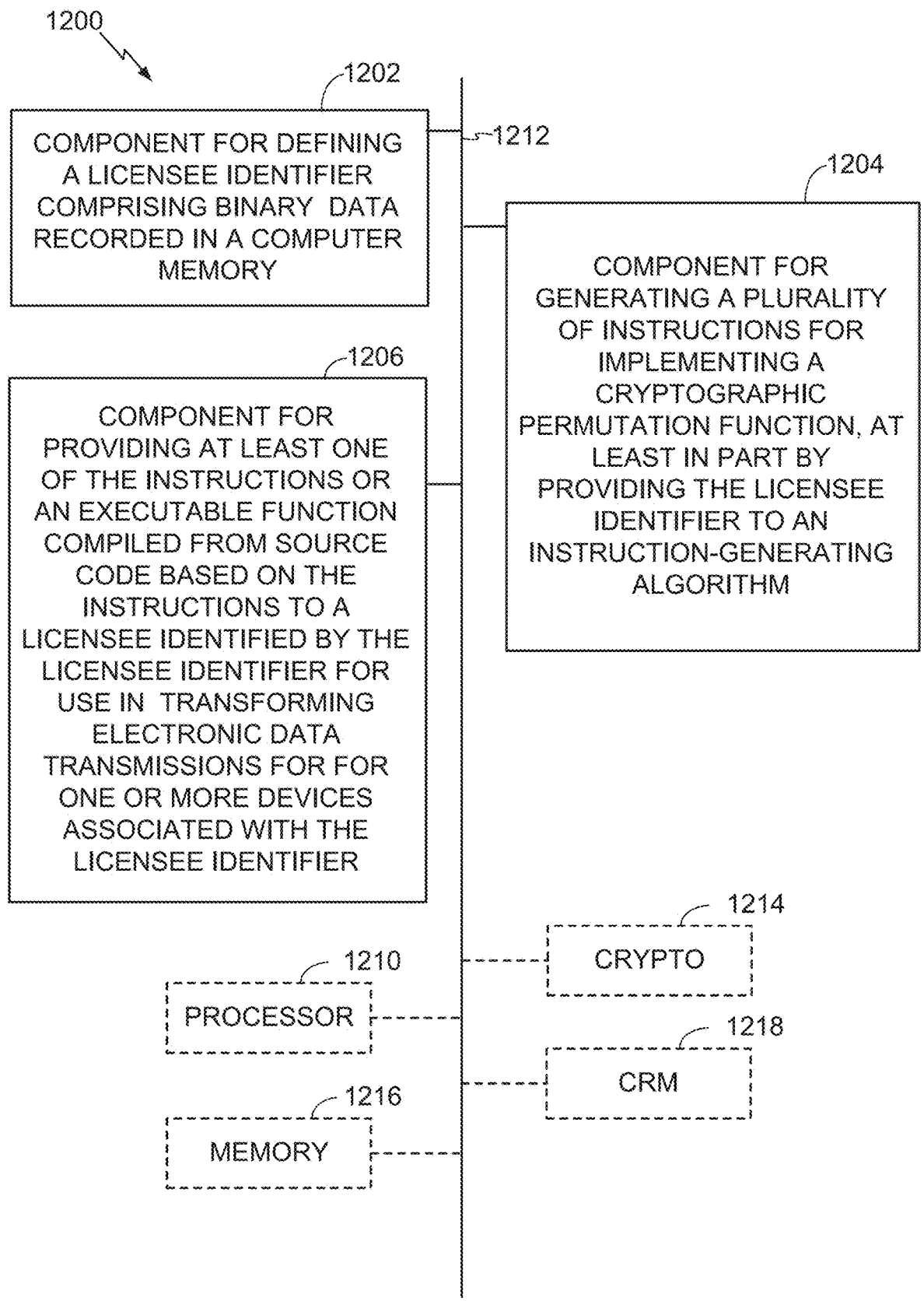
FIG. 12 is a conceptual block diagram illustrating components of an apparatus or system for protecting content using a licensable function.
Figure 13:
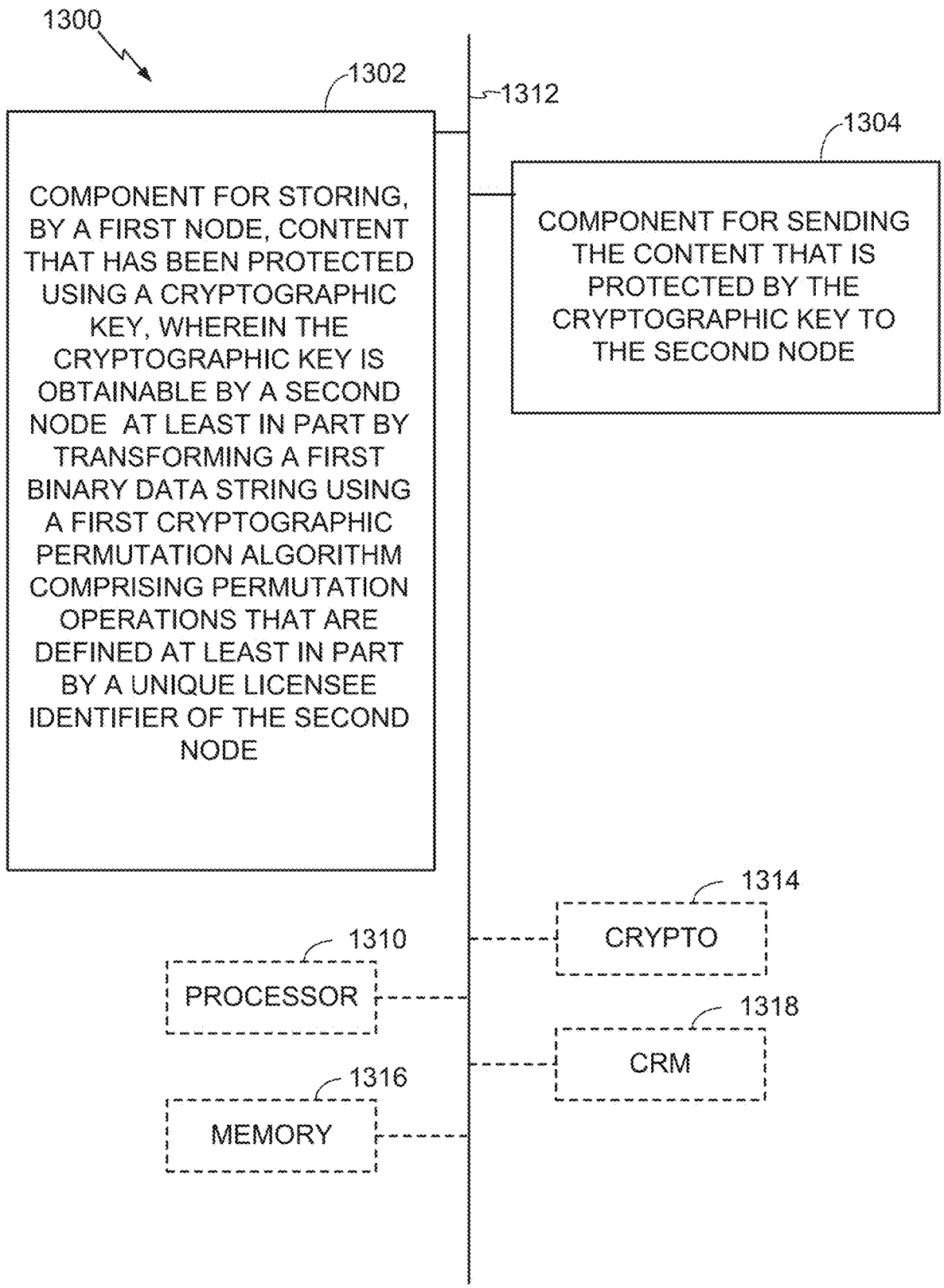
FIG. 13 is a conceptual block diagram illustrating components of an apparatus or system for protecting content stored in a storage node using a licensable function.

FIGS. 11-13 generally illustrate a method and an apparatus for protecting content in accordance with at least some of the data and key protection features previously shown in FIG. 4. Referring to FIG. 11, a method 1100 for protecting content stored at a first node (e.g., storage node) may include, at 1110, storing, by the first node, content that has been protected using a cryptographic key, wherein the cryptographic key is obtainable by a second node (e.g., a content access node) at least in part by transforming a first binary data string using a first cryptographic permutation algorithm comprising permutation operations that are defined at least in part by a unique licensee identifier of the second node. For example, a storage node may receive content that has been encrypted using a method as described herein, and place the received content into a device memory. The method 1100 may further include, at 1120 sending the content that is protected by the cryptographic key to the second node. The first cryptographic permutation algorithm may include ARX components. In an aspect, the method 1100 may include providing an output by the first node to the second node, the output being useable by the second node to obtain the cryptographic key, the output being based at least in part on transforming a second binary data string using a second cryptographic permutation algorithm comprising permutation operations that are defined at least in part by a unique licensee identifier of the first node. The first or second node may obtain its cryptographic permutation algorithm, for example, from a license administration server, or during factory configuration. The cryptographic permutation algorithm based on unique licensee identifier may thus be used to verify proof of knowledge for a particular device and can be used as part of a key protection scheme, as previously discussed above.

In another aspect of the method 1100, values controlling addition, rotation, and "exclusive or" components of the permutation function may be determined by the second node based on a pseudorandom string that is a pseudorandom function of the licensee identifier of the second node. The same may also be applicable for the first node.

The method 1100 may further include retrieving the second cryptographic permutation algorithm from a secure memory of the first node (e.g., storage device), wherein the secure memory is restricted from access except for facilitating secure content transfers. In an aspect, the method 1100 may include storing the second cryptographic permutation algorithm in the secure memory, during an initial configuration of the first node by a licensee to whom the unique licensee identifier of the first node is assigned. The same may also be applicable for the second node.

FIG. 12 is a conceptual block diagram illustrating components of an apparatus or system 1200 for protecting content as described herein. The apparatus or system 1200 may include additional or more detailed components as described herein. For example, the processor 1210 and memory 1216 may be coupled to other components as described herein above, including the more detailed components pointed out in FIGS. 2, 5 and other ancillary components. As depicted, the apparatus or system 1200 may include functional blocks that can represent functions implemented by a processor, software, or combination thereof (e.g., firmware).

As illustrated in FIG. 12, the apparatus or system 1200 may comprise an electrical component 1202 for defining a licensee identifier comprising binary data recorded in a computer memory. The component 1202 may be, or may include, a means for said defining. Said means may include the processor 1210 coupled to the memory 1216, and to the input device 1214, the processor executing an algorithm based on program instructions stored in the memory. Such algorithm may include a sequence of more detailed operations, for example, as described above in connection with FIG. 5 at 510.

The apparatus 1200 may further include an electrical component 1204 for generating a plurality of instructions for implementing a cryptographic permutation function, at least in part by providing the licensee identifier to an instruction-generating algorithm. The component 1204 may be, or may include, a means for said generating. Said means may include the processor 1210 coupled to the memory 1216, and to the input device 1214, the processor executing an algorithm based on program instructions stored in the memory. Such algorithm may include a sequence of more detailed operations, for example, one or more of the more detailed operations described in connection with FIGS. 5-7, or otherwise described above.

The apparatus 1200 may further include an electrical component 1206 for providing at least one of the instructions or an executable function compiled from source code based on the instructions to the licensee for use in transforming (e.g., protecting) electronic data transmissions for one or more devices associated with the licensee identifier. The component 1204 may be, or may include, a means for said providing. Said means may include the processor 1210 coupled to the memory 1216, and to the input device 1214, the processor executing an algorithm based on program instructions stored in the memory. Such algorithm may include a sequence of more detailed operations, for example, transmitting the instructions to a secure server at a network address associated with the licensee identifier, with an indication that the instruction may be used for an initial configuration of a storage device during manufacture, or one or more of the more detailed operations otherwise described above.

The apparatus 1200 may optionally include a processor module 1210 having at least one processor, in the case of the apparatus 1200 configured as a data processor. The processor 1210, in such case, may be in operative communication with the modules 1202-1206 via a bus 1212 or other communication coupling, for example, a network. The processor 1210 may effect initiation and scheduling of the processes or functions performed by electrical components 1202-1206.

In related aspects, the apparatus 1200 may include a network interface module (not shown) operable for communicating with a licensee client node over a computer network. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1206, and subcomponents thereof, or the processor 1210, or the method 800 and one or more of the additional operations 900 or 1000 disclosed herein. The memory module 1216 may retain instructions for executing functions associated with the modules 1202-1206. While shown as being external to the memory 1216, it is to be understood that the modules 1202-1206 can exist within the memory 1216.

The apparatus 1200 may include a non-transitory computer read/writable medium 1218, of any suitable type. Examples have been described above, for example in connection with FIG. 2. The cryptographic device 1214 may comprise an integrated circuit as described above in connection with FIG. 2, or similar component.

FIG. 13 is a conceptual block diagram illustrating components of an apparatus or system 1300 for securing electronic data transfer at a storage node as described herein. As depicted, the apparatus or system 1300 may include functional blocks that can represent functions implemented by a processor, software, or combination thereof (e.g., firmware).

As illustrated in FIG. 13, the apparatus or system 1300 may comprise an electrical component 1302 for storing, by a first node, content that has been protected using a cryptographic key, wherein the cryptographic key is obtainable by a second node at least in part by transforming a first binary data string using a first cryptographic permutation algorithm comprising permutation operations that are defined at least in part by a unique licensee identifier of the second node. The component 1302 may be, or may include, a means for said storing protected data. Said means may include the processor 1310 coupled to the memory 1316, and to the input device 1314, the processor executing an algorithm based on program instructions stored in the memory. Such algorithm may include a sequence of more detailed operations, for example, receiving data and metadata via one or more transmission pathways, using the metadata to determine that the data is protected using a cryptographic key, wherein the cryptographic key is obtainable by a second node at least in part by transforming a first binary data string using a first cryptographic permutation algorithm comprising permutation operations that are defined at least in part by a unique licensee identifier of the second node, and storing the data in a memory location selected based on the determined level of protection.

The apparatus 1300 may further include an electrical component 1304 for sending the content that is protected by the cryptographic key to the content access node. The component 1304 may be, or may include, a means for said sending. Said means may include the processor 1310 coupled to the memory 1316, and to the input device 1314, the processor executing an algorithm based on program instructions stored in the memory. Such algorithm may include a sequence of more detailed operations, for example, further encrypting the content using another encryption key, and transmitting the twice-encrypted content to the content access node.

The apparatus 1300 may optionally include a processor module 1310 having at least one processor, in the case of the apparatus 1300 configured as a data processor. The processor 1310, in such case, may be in operative communication with the modules 1302-1304 via a bus 1312 or other communication coupling, for example, a network. The processor 1310 may effect initiation and scheduling of the processes or functions performed by electrical components 1302-1304.

In related aspects, the apparatus 1300 may include a network interface module (not shown) operable for communicating with a content access node over a computer network. In further related aspects, the apparatus 1300 may optionally include a module for storing information, such as, for example, a memory device/module 1316. The computer readable medium or the memory module 1316 may be operatively coupled to the other components of the apparatus 1300 via the bus 1312 or the like. The memory module 1316 may be adapted to store computer readable instructions and data for effecting the processes and behavior of the modules 1302-1304, and subcomponents thereof, or the processor 1310, or the method 1100 and one or more of the additional operations described in connection with the method 1100. The memory module 1316 may retain instructions for executing functions associated with the modules 1302-1304. While shown as being external to the memory 1316, it is to be understood that the modules 1302-1304 can exist within the memory 1316.

The apparatus 1300 may include a non-transitory computer read/writable medium 1318, of any suitable type. The medium 1318 may be configured with a user area, and a non-user area, as described above in connection with FIG. 3. The cryptographic device 1314 may comprise an integrated circuit as described above in connection with FIG. 3, or similar component.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for enabling a secure electronic data, the method comprising:

defining a first licensee identifier that uniquely identifies a first licensee, the first licensee identifier comprising binary data;

generating a first plurality of instructions for implementing a first cryptographic permutation function at least in part by inputting the first licensee identifier to an instruction-generating algorithm;

providing at least one of the first instructions or a first executable function compiled from source code based on the first instructions to the first licensee for execution on a first device;

defining a second licensee identifier that uniquely identifies a second licensee, the second licensee identifier comprising binary data;

generating a second plurality of instructions for implementing a second cryptographic permutation function at least in part by inputting the second licensee identifier to the instruction-generating algorithm;

providing at least one of the second instructions or a second executable function compiled from source code based on the second instructions to the second licensee for execution on a second device; and wherein the first cryptographic permutation function is implemented by the first device and the second cryptographic permutation function is implemented by the second device to derive a cryptographic key to decrypt electronic data stored in the first device and accessed at the second device.

2. The method of claim 1, wherein generating the plurality of instructions for implementing the first cryptographic permutation function is based on a pseudorandom byte string, wherein operation of the first cryptographic permutation function when compiled and executed by a processor of the first device is uniquely determined by the pseudorandom byte string.

3. The method of claim 2, wherein the first cryptographic permutation function comprises "Addition, cyclic Rotation and eXclusive or" (ARX) components.

4. The method of claim 3, wherein values controlling the addition, rotation, and "exclusive or" ARX components are determined based on the pseudorandom byte string that is, in turn, a pseudorandom function of the first licensee identifier.

5. The method of claim 2, further comprising generating, by a string-generating algorithm, the pseudorandom byte string based on the first licensee identifier, the pseudorandom byte string being unique to the first licensee identifier.

6. The method of claim 5, wherein the string-generating algorithm takes a system key and the first licensee identifier as inputs.

7. The method of claim 2, further comprising recording at least one of the first licensee identifier, the first plurality of instructions, the first executable function, or the pseudorandom byte string in an electronic database, in association with identifying information for the first licensee.

8. The method of claim 1, wherein the first device includes a storage device associated with the first licensee identifier, and the second device includes a player device associated with the second licensee identifier.

9. An apparatus for enabling a secure electronic data, the apparatus comprising:

a processor; and a memory coupled to the processor, wherein the memory holds instructions that when executed by the processor, cause the apparatus to perform:

defining a first licensee identifier that uniquely identifies a first licensee, the first licensee identifier comprising binary data;

generating a first plurality of instructions for implementing a first cryptographic permutation function at least in part by inputting the first licensee identifier to an instruction-generating algorithm;

providing at least one of the first instructions or a first executable function compiled from source code based on the first instructions to the first licensee for execution on a first device;

defining a second licensee identifier that uniquely identifies a second licensee, the second licensee identifier comprising binary data;

generating a second plurality of instructions for implementing a second cryptographic permutation function at least in part by inputting the second licensee identifier to the instruction-generating algorithm;

providing at least one of the second instructions or a second executable function compiled from source code based on the second instructions to the second licensee for execution on a second device; and wherein the first cryptographic permutation function is implemented by the first device and the second cryptographic permutation function is implemented by the second device to derive a cryptographic key to decrypt electronic data stored in the first device and accessed at the second device.

10. The apparatus of claim 9, wherein the first plurality of instructions for implementing the first cryptographic permutation function are based on a pseudorandom byte string, wherein operation of the first cryptographic permutation function when compiled and executed by a processor of the first device is uniquely determined by the pseudorandom byte string.

11. The apparatus of claim 10, wherein the first cryptographic permutation function includes "Addition, cyclic Rotation and eXclusive or" (ARX) components.

12. The apparatus of claim 11, wherein values controlling the addition, rotation, and "exclusive or" ARX components are determined based on the pseudorandom byte string that is, in turn, a pseudorandom function of the first licensee identifier.

13. The apparatus of claim 10, wherein the pseudorandom byte string is generated by a string-generating algorithm based on the first licensee identifier, the pseudorandom byte string being unique to the first licensee identifier.

14. The apparatus of claim 13, wherein a system key and the first licensee identifier are provided as inputs to the string-generating algorithm.

15. The apparatus of claim 10, wherein the memory holds further instructions for recording at least one of the first licensee identifier, the first plurality of instructions, the first executable function, or the pseudorandom byte string in an electronic database, in association with identifying information for the first licensee.

16. A non-transitory computer-readable medium encoded with instructions that when executed by a processor, cause an apparatus to perform:

defining a first licensee identifier that uniquely identifies a first licensee, the licensee identifier comprising binary data;

generating a first plurality of instructions for implementing a first cryptographic permutation function at least in part by inputting the first licensee identifier to an instruction-generating algorithm;

providing at least one of the first instructions or a first executable function compiled from source code based on the first instructions to the first licensee for execution on a first device;

defining a second licensee identifier that uniquely identifies a second licensee, the second licensee identifier comprising binary data;

generating a second plurality of instructions for implementing a second cryptographic permutation function at least in part by inputting the second licensee identifier to the instruction-generating algorithm;

providing at least one of the second instructions or a second executable function compiled from source code based on the second instructions to the second licensee for execution on a second device; and wherein the first cryptographic permutation function is implemented by the first device and the second cryptographic permutation function is implemented by the second device to derive a cryptographic key to decrypt electronic data stored in the first device and accessed at the second device.

17. An apparatus for enabling a secure electronic data, the apparatus comprising:

means for defining a first licensee identifier that uniquely identifies a first licensee, the first licensee identifier comprising binary data;

means for generating a first plurality of instructions for implementing a first cryptographic permutation function at least in part by inputting the first licensee identifier to an instruction-generating algorithm;

means for providing at least one of the first instructions or a first executable function compiled from source code based on the first instructions to the first licensee for execution on a first device;

means for defining a second licensee identifier that uniquely identifies a second licensee, the second licensee identifier comprising binary data;

means for generating a second plurality of instructions for implementing a second cryptographic permutation function at least in part by inputting the second licensee identifier to the instruction-generating algorithm;

means for providing at least one of the second instructions or a second executable function compiled from source code based on the second instructions to the second licensee for execution on a second device; and wherein the first cryptographic permutation function is implemented by the first device and the second cryptographic permutation function is implemented by the second device to derive a cryptographic key to decrypt electronic data stored in the first device and accessed at the second device.

18. A computer-implemented method for protecting content, the method comprising:

storing, by a first hardware processor, content that has been protected using a cryptographic key;

transforming, by the first hardware processor, a first binary data string using a first cryptographic permutation algorithm to generate an output, the first cryptographic permutation algorithm comprising permutation operations that are defined at least in part by a first unique licensee identifier of the first hardware processor;

providing the output to a second hardware processor, wherein the output is used by the second hardware processor to obtain the cryptographic key by transforming a second binary data string using a second cryptographic permutation algorithm comprising permutation operations that are defined at least in part by a second unique identifier for multiple devices including the second hardware processor; and sending the content that is protected by the cryptographic key to the second hardware processor.

19. The method of claim 18, wherein the first cryptographic permutation algorithm comprises "Addition, cyclic Rotation and eXclusive or" (ARX) components.

20. The method of claim 19, wherein values controlling the addition, rotation, and "exclusive or" ARX components are determined based on a pseudorandom byte string that is a pseudorandom function of the first unique licensee identifier.

21. The method of claim 18, further comprising storing the first cryptographic permutation algorithm in a secure memory during an initial configuration of the first hardware processor by a licensee to whom the first unique licensee identifier of the first hardware processor is assigned.

22. An apparatus for protecting content, the apparatus comprising:

a processor; and a memory coupled to the processor, wherein the memory holds instructions that when executed by the processor, cause the apparatus to perform:

storing content that has been protected using a cryptographic key;

transforming a first binary data string using a first cryptographic permutation algorithm to generate an output, the first cryptographic permutation algorithm comprising permutation operations that are defined at least in part by a first unique licensee identifier of the apparatus;

providing the output to a second computer, wherein the output is used by the second computer to obtain the cryptographic key by transforming a second binary data string using a second cryptographic permutation algorithm comprising permutation operations that are defined at least in part by a second unique identifier for multiple devices including the second computer; and sending the content that is protected by the cryptographic key to the second computer.

23. The apparatus of claim 22, wherein the first cryptographic permutation algorithm comprises "Addition, cyclic Rotation and eXclusive or" (ARX) components.

24. The apparatus of claim 23, wherein values controlling the addition, rotation, and "exclusive or" ARX components are determined based on a pseudorandom byte string that is a pseudorandom function of the first unique licensee identifier of the apparatus.

25. The apparatus of claim 22, wherein the memory holds further instructions for storing the first cryptographic permutation algorithm in a secure memory during an initial configuration of the apparatus by a licensee to whom the first unique licensee identifier of the apparatus is assigned.

26. A non-transitory computer-readable medium encoded with instructions that when executed by a processor of a first computer, cause the first computer to perform:

storing content that has been protected using a cryptographic key;

transforming a first binary data string using a first cryptographic permutation algorithm to generate an output, the first cryptographic permutation algorithm comprising permutation operations that are defined at least in part by a first unique licensee identifier of the first computer;

providing the output to a second computer, wherein the output is used by the second computer to obtain the cryptographic key by transforming a second binary data string using a second cryptographic permutation algorithm comprising permutation operations that are defined at least in part by a second unique identifier for multiple devices including the second computer; and sending the content that is protected by the cryptographic key to the second computer.

27. An apparatus for protecting content, the apparatus comprising:

means for storing content that has been protected using a cryptographic key;

means for transforming a first binary data string using a first cryptographic permutation algorithm to generate an output, the first cryptographic permutation algorithm comprising permutation operations that are defined at least in part by a first unique licensee identifier of the apparatus;

means for providing the output to a second computer, wherein the output is used by the second computer to obtain the cryptographic key by transforming a second binary data string using a second cryptographic permutation algorithm comprising permutation operations that are defined at least in part by a second unique identifier for multiple devices including the second computer; and means for sending the content that is protected by the cryptographic key to the second computer.

* * * * *